(12) United States Patent
Engel et al.

(10) Patent No.: US 9,361,212 B2
(45) Date of Patent: Jun. 7, 2016

(54) COMPUTATION APPARATUS WITH COORDINATION OF THE ACCESS TO AN INTERNAL MEMORY AND OPERATING METHOD

(75) Inventors: Michael Engel, Beeskow (DE); Frederik Heuser, Nürnberg (DE); Michael Schlereth, Wilhermsdorf (DE); Robert Winter, Velburg (DE)

(73) Assignee: Siemens Aktiengesellschaft, Munich (DE)

( * ) Notice: Subject to any disclaimer, the term of this patent is extended or adjusted under 35 U.S.C. 154(b) by 562 days.

(21) Appl. No.: 13/703,312

(22) PCT Filed: Jun. 10, 2010

(86) PCT No.: PCT/EP2010/003482
§ 371 (c)(1),
(2), (4) Date: Mar. 15, 2013

(87) PCT Pub. No.: WO2011/154020
PCT Pub. Date: Dec. 15, 2011

(65) Prior Publication Data
US 2013/0205103 A1  Aug. 8, 2013

(30) Foreign Application Priority Data
Jun. 9, 2010 (WO) ................ PCT/EP2010/003468

(51) Int. Cl.
*G06F 12/00* (2006.01)
*G05B 19/05* (2006.01)

(52) U.S. Cl.
CPC ............... *G06F 12/00* (2013.01); *G05B 19/05* (2013.01)

(58) Field of Classification Search
CPC ............ G06F 17/30011; G06F 17/30716; G06F 3/0483; G06F 11/0715; G06F 11/0769; G06F 11/0793; G06F 11/3006; G06F 11/3055; G06F 11/3636; G06F 11/3656; G06F 17/30; G06F 9/45533; G06F 2009/45583; G06F 2209/5021; G06F 2009/45579; G06F 9/3004; G06F 9/4825; G06F 2009/45575; G06F 9/4856; G06F 19/05
USPC ........................................................ 711/151
See application file for complete search history.

(56) References Cited

U.S. PATENT DOCUMENTS

| 6,021,356 A | 2/2000 | Chang |
| 2004/0098141 A1 | 5/2004 | Martin |

(Continued)

FOREIGN PATENT DOCUMENTS

| CN | 1182991 | 5/1998 |
| CN | 1855055 | 11/2006 |
| EP | 0 363 905 | 4/1990 |

*Primary Examiner* — Kevin Verbrugge
*Assistant Examiner* — Candice Rankin
(74) *Attorney, Agent, or Firm* — Cozen O'Connor

(57) ABSTRACT

A programmable logic controller (PLC) with changing memory access times is intended to interact with a subordinate system, i.e., a discontinuous virtualized system, wherein a computation apparatus is provided, in which the PLC is implemented and in which the system that is subordinate to the PLC with respect to an operation to access the memory access is implemented. A memory to which a component of the PLC has access is integrated in the PLC. Also implemented in the computation apparatus is a proxy device that coordinates access to the memory of the PLC by the subordinate system such that simultaneous access by the component of the PLC has priority over access by the subordinate system and it is thus possible to ensure that the PLC always complies with a predefined cycle time of the PLC.

7 Claims, 3 Drawing Sheets

(56) References Cited

U.S. PATENT DOCUMENTS

| | | |
|---|---|---|
| 2005/0246453 A1 | 11/2005 | Erlingsson et al. |
| 2006/0248042 A1 | 11/2006 | Anna Janssens |
| 2009/0300605 A1* | 12/2009 | Edwards et al. ............... 718/1 |
| 2010/0318683 A1* | 12/2010 | Lange et al. ............... 709/246 |
| 2011/0138387 A1* | 6/2011 | Ahn et al. ............... 718/1 |
| 2011/0219364 A1* | 9/2011 | Makarov ............... 717/151 |

\* cited by examiner

COMPUTATION APPARATUS WITH COORDINATION OF THE ACCESS TO AN INTERNAL MEMORY AND OPERATING METHOD

CROSS-REFERENCE TO RELATED APPLICATIONS

This is a U.S. national stage of application No. PCT/EP2010/003482 filed 10 Jun. 2010. Priority is claimed on International Application No. PCT/EP2010/003468.9 filed 9 Jun. 2010, the content of which is incorporated herein by reference in its entirety.

BACKGROUND OF THE INVENTION

1. Field of the Invention

The present invention relates to a computation apparatus in which a programmable logic controller is implemented and in which a system that is subordinate to the programmable logic controller with respect to a memory access operation is implemented, where a memory to which a component of the programmable logic controller has access is integrated in the programmable logic controller. The present invention also relates to a method for operating the computation apparatus.

2. Description of the Related Art

The virtualization of a system in information technology began over 10 years ago. As it spreads, virtualization in general and real-time virtualization in particular can be found in the field of automation. However, various problems arise from the interplay between real-time systems and virtualization solutions. Firstly, expectations relating to time differ.

Where a real-time system expects a very precise execution, with a virtualized system it is by all means possible to dispense with several seconds of computing time. This requires asynchronous execution of both systems. Secondly, problems come to light as soon as shared data is to be used by both the real-time system and the virtual machines, and this occurs in particular if an interface for control and monitoring (CaM) of the real-time system is described in the virtual machine. However, the combination of a real-time controller and a virtual system with CaM components is desirable since both systems can be operated separately from each other in this way. By way of example, a change in the real-time system only has an effect on the CaM to the extent that a suitable hypervisor (abstraction layer) has to be implemented. It is possible to continue to use customized CaM components, such as operating consoles or touchscreens unchanged as a result of the abstraction. On the other hand, program errors in the CaM system, which lead to impairment of the underlying operating system, do not affect the real-time system, so additional stability is obtained. Finally, the time-related aspects continue to be an unresolved problem which can make communication between the systems difficult.

Similar problems exist with the coupling of CaM systems and controllers, the advantage existing here of these systems usually being operated on separate computers. A system comprising a controller and CaM on a system with the arrangement mentioned above would therefore be most comparable. Nevertheless, with the combination of a controller and CaM there is the advantage that different time bases are not used here and the same operating system is utilized. The problem described above did not previously exist therefore. This is explained by the nascent spread of virtualization in the world of automation, with which primarily previously unused processor times are avoided. However, joint and potentially conflicting data access operations are a known problem in connection with real-time systems. This can be remedied by the use of synchronization mechanisms (semaphores, Mutex) or the allocation of exclusive access times in the case of synchronous systems. These methods can basically also still be used but throw up hitherto unresolved problems if a programmable logic controller (PLC) cooperates with a virtual machine. These problems are due to the fact that the PLC does not work with constant cycle times, and the memory access operations by the PLC therefore evade prediction.

Synchronization mechanisms, on the other hand, lead under adverse preconditions to conflicting access operations, which cannot be resolved, and therewith to violations of exacting real-time demands. Furthermore, the use of independent operating systems makes the use of synchronization mechanisms difficult. An approach of this kind therefore requires an alternative method.

Furthermore, virtual machines are not permanently available because other processes also have to be executed on a processor. In detail, this means that the virtual machine is stopped at irregular intervals to execute privileged commands or to use the computer time that has been freed thereby for other tasks (for example, host applications). In the general information technology (IT) environment, this does not constitute a problem because definitive response times are not expected here.

EP 0 363 905 A2 describes an input/output device for a programmable logic controller. The CPU of the programmable logic controller can be accessed by a user circuit. Access to the CPU using the user circuit is not enabled with a decision means if the CPU outputs a read or write signal.

US 2005/0246453 A1 relates to the direct access to computation apparatuses that are coupled to subordinate computation apparatuses.

US 2004/0098131 A1, furthermore, describes a software development platform with which a universal interface to a plurality of programmable logic controllers is enabled. This interface can be implemented by a device, such as a virtual machine.

SUMMARY OF THE INVENTION

It is therefore an object of the present invention to enable shared memory use for a PLC with changing memory access times and a subordinate system, such as a discontinuous virtualized system.

This and other objects and advantages are achieved in accordance with the invention by a computation apparatus, in which a programmable logic controller is implemented, and in which a system that is subordinate to the programmable logic controller with respect to a memory access operation is implemented, where a memory to which a component of the programmable logic controller has access is integrated in the programmable logic controller, and where a proxy device that coordinates access to the memory of the programmable logic controller by the subordinate system such that simultaneous access by the component of the programmable logic controller has priority over access by the subordinate system is implemented in the computation apparatus.

In accordance with the invention, the proxy devices ensures that the programmable logic controller reliably receives access to the memory within a predefined period L. Access is in this connection taken to mean a complete cycle from the request through to complete response. Real-time operation of the PLC can be maintained by way of this reliable access guarantee.

It is also an object of the invention to provide a method for operating a computation apparatus as above, where access by the subordinate system to the memory of the programmable logic controller is coordinated such that simultaneous access by the component of the programmable logic controller has priority over access by the subordinate system, where the programmable logic controller reliably receives access to the memory within a predefined period.

It is therefore advantageously possible to fulfill the real-time demands of a PLC and simultaneously ensure access to the memory of the PLC for a subordinate system that is not subject to real-time demands of this kind.

The subordinate system preferably includes a virtual machine. A discontinuous virtualized system can thereby interact with a PLC with changing memory access times with respect to the shared use of, for example, a memory.

Specifically, the virtual machine can comprise a control and monitoring unit (HMI interface), a simulation unit and/or tool management unit. With the aid of the virtual machine, the CaM may be operated separately from the PLC, so that a change in the PLC or real-time system has no effects on the CaM.

The proxy device can also be part of the programmable logic controller. The memory access operations by the subordinate system can sometimes be simplified thereby.

In particular, the proxy device can ensure that access by the subordinate system to the memory is completely terminated if an access request from the programmable logic controller exists and complete access by the programmable logic controller is still ensured within the predefined period from the access request. The PLC does not have to be granted absolute priority thereby in the case of memory access, and the real-time condition is still fulfilled. Processor time can, as a rule, be reduced thereby.

It is also advantageous if the proxy device ensures that, in the event an access request from the programmable logic controller exists, access by the subordinate system is revoked if its completion would mean it would not be possible for the programmable logic controller to gain access within the predefined period Δ. This procedure (i.e., roll-back) can ensure that the real-time condition is maintained even if a relatively long access operation has been started by the subordinate system before the access request by the PLC.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will now be illustrated in more detail with the aid of the accompanying drawings, in which.

DETAILED DESCRIPTION OF THE PREFERRED EMBODIMENTS

The exemplary embodiments described in more detail below are preferred embodiments of the present invention.

Figure 1:
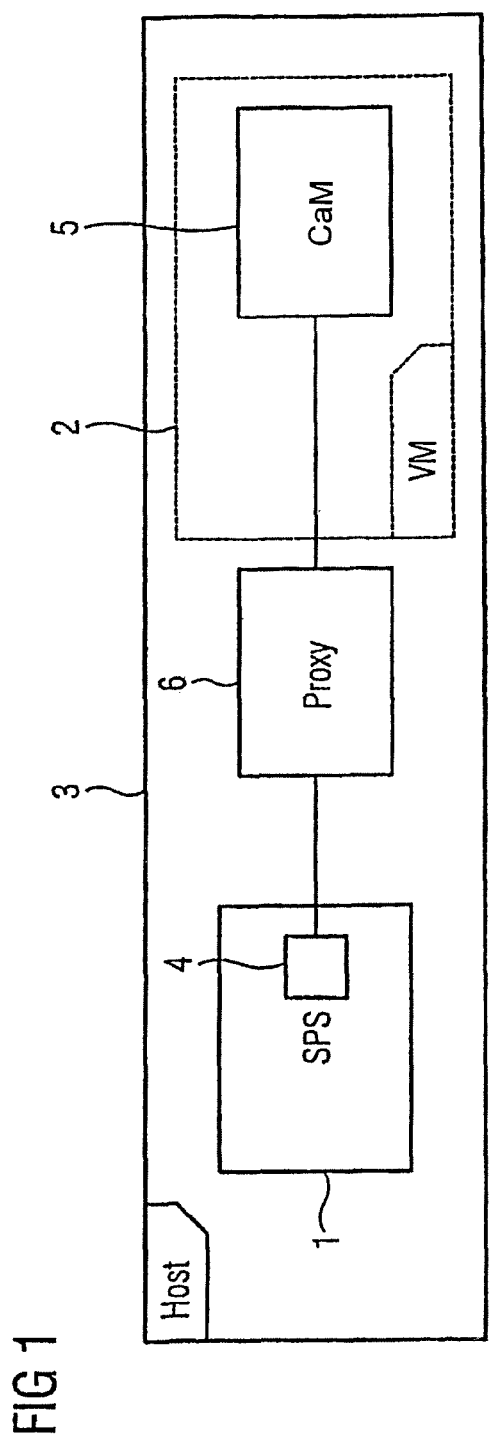
FIG. 1 shows a schematic block diagram of an inventive computation apparatus in accordance with the invention.

In the exemplary system of FIG. 1, a PLC 1 (programmable logic controller) and VM 2 (virtual machine) are combined. The PLC 1 is a priority system with respect to memory access, whereas the VM 2 is a subordinate system. In addition, the PLC 1 has changing memory access times and the VM 2 is a discontinuous system. Both, the PLC 1 and the VM2, are implemented on a common host 3 here. The memory 4, which the PLC 1 and VM 2 wish to access, is integrated in the PLC 1 here. In the case of memory access, the aim is to avoid potential off times (idle) and therefore enable optimum utilization of the overall system.

A CaM 5, by way of example, is implemented on the virtual machine. The CaM 5 and the PLC 1 are completely separate systems. The CaM 5 originates, for example, from a different manufacturer to the PLC 1. The operating systems of PLC 1 and CaM 5 can also be different. The virtual machine VM 2 creates the required abstraction level.

A plurality of subordinate systems (i.e., virtual machines) may also be implemented on the host 3. Even then, the aim is still for all systems to be able to access the memory 4 of the PLC 1.

A fundamental aspect in the case of access to the memory 4 is that the PLC 1 ultimately has priority and memory access by a component of the PLC 1 to the memory 4 is not disrupted by memory access by the VM 2 or another subordinate system. By way of example, a system comprises an emergency stop switch whose signal the PLC 1 has to process without delay. The emergency stop status is stored in the memory 4. It is important that this emergency stop status is also displayed in the CaM 5, although an update of the display, for example, every 10 seconds is sufficient. The VM 2 therefore has to access the memory 4 for the CaM 5 such that the PLC 1 is not disrupted. What is known as a proxy 6 (also called a proxy device in the present application) is connected between the memory 4 and the virtual machine 2 for this purpose. The proxy 6 primarily has the task of coordinating instances of access to the memory 4. It potentially buffers data for this purpose. It may also include a filtering function, moreover. A proxy 6 for data access operations by the virtual machine VM 2 is implemented on the host 3 therefore. There is the option in this connection of using the proxy 6 on its own as in the example of FIG. 1. In an alternative embodiment, the proxy 6 is implemented as part of the PLC 1. An implementation of the proxy 6 in the VM 2 is not possible, by contrast, because the VM 2 does not run continuously and therefore unbroken coordination of memory access would not be possible.

The function of the proxy 6 consists in accepting access requests from the VM 2 or the plurality of virtual machines and executing them following conclusion of the request transfer by the proxy 6 if there is currently no access by the PLC 1 pending. Execution occurs even if the VM 2 is not available at this instant.

The transfer of data between proxy 6 and VM2 does not require a separate network or communications connection here because both systems use the same physical memory owing to the peculiarities of a VM. Direct access to this memory 4 by the proxy application running on the host 3 is therefore possible, and this access is controlled by a corresponding consistency (no simultaneous memory access). The advantage in this connection lies firstly in the shorter access times to the data since the proxy 6 runs on the host level and not on the VM level. Furthermore, the advantage of the system in accordance with the invention consists in the possibility of accessing the memory 4 even if the VM 2 does not currently have any processor time. If the request has been executed and the VM 2 is available again, the corresponding response is delivered to the VM 2.

Figure 2:
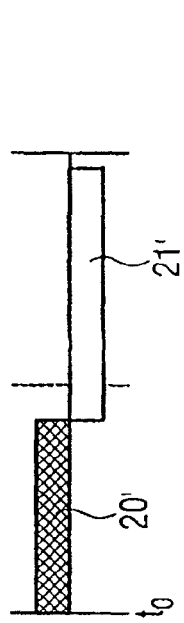
FIG. 2 shows a timing diagram for an access request situation and an inventive access operation execution in the case of successive requests respectively.
Figure 2:
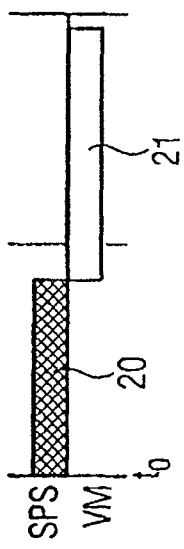
Figure 3:
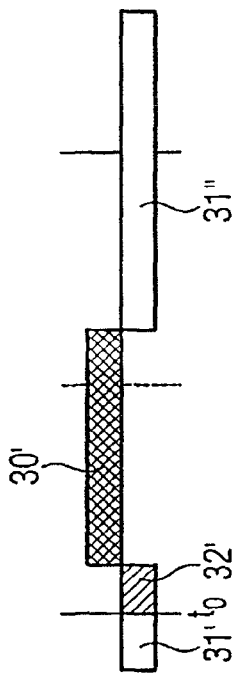
FIG. 3 shows a timing diagram for a memory request situation and a memory access situation with roll back requirement respectively, in accordance with the invention.
Figure 3:
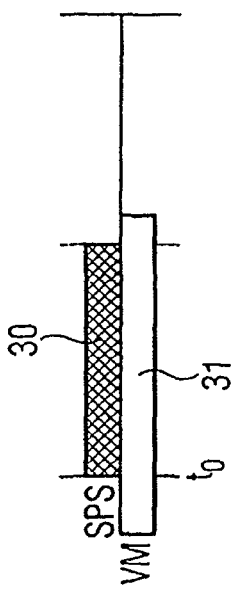
Figure 4:
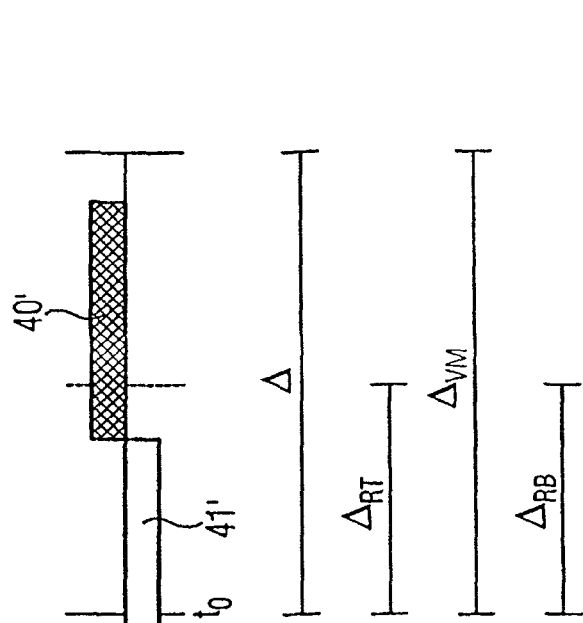
FIG. 4 shows a timely flowchart of an access request situation and an inventive access operation execution in the case of premature termination of access by the subordinate system, respectively.
Figure 4:
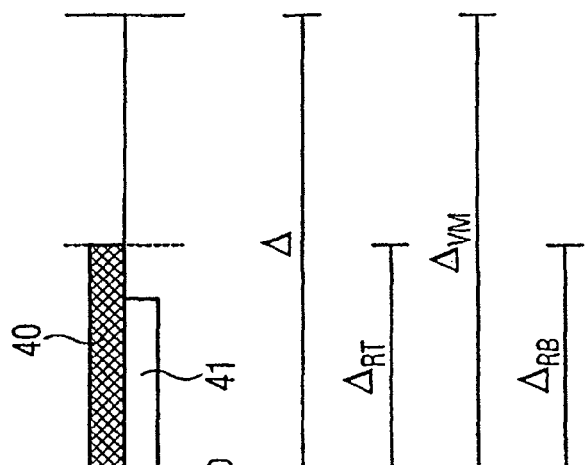

In the presently contemplated exemplary embodiment, decoupling of the availability of the virtual machine VM 2 from the actual data access is ensured but conflicting data access operations by PLC 1 and proxy 6 are possible. The conflicting data access operations are therefore controlled by a dynamic access time regulation that guarantees the PLC 1 a definite response which is necessary for real-time systems. A time slot Δ is defined for this purpose, in which access for the PLC 1 is ensured by this method. This time slot Δ is illustrated in FIGS. 2 to 4. The time in this time slot Δ is measured by the first request for access to the critical memory area by the PLC 1. Alternatively, this time slot could also be coupled to the cycle time of the controller, primarily in the case of synchronous systems, in which all actions are controlled by a fixed clock.

Here, the maximum required access time of the PLC 1 is defined by $\Delta_{RT}$. The maximum access time of the virtual machine(s), which manifests itself in access by the proxy 6, to be defined as a function of a "roll back" method, in which a memory access which has begun is reversed, is defined by $\Delta_{VM}$. In the present example, the maximum access time $\Delta_{VM}$ of the virtual machines is equal to the time Δ in which access for the PLC must be ensured. The current time, based on the start of time measurement of $\Delta_{VM}$, will be denoted hereinafter by $\Delta_t$ and measured by a hardware timer. To keep the delays during access by the virtual machine low, firstly only one access operation respectively by the virtual machine is allowed at any one time and, secondly, a "roll back" method is taken into account. The "roll back" method is used to enable access by the PLC 1 within the ensured time and therefore, if required, to revoke access by the VM 2, which has already begun and which occurs via the proxy 6, to the jointly used memory area 4, and to obtain the consistent state therewith. The maximum required time for the "roll back" is indicated by $\Delta_{RB}$. The speed of the selected method is expressed by 1/x here. Overall the following time response results herefrom:

$$\Delta = \begin{vmatrix} \Delta_{RB} + \Delta_{RT}; & \text{for } \Delta_t < \Delta_{RB} \\ \Delta_{Vm} - \Delta_t + \Delta_{RT}; & \text{for } \Delta_t \geq \Delta_{RB} \end{vmatrix} \quad (1)$$

$$\Delta_{RB} \leq \frac{1}{x} \Delta_{VM} \quad (2)$$

This means that, assuming freedom of access with respect to the PLC 1, access in the name of VM 2 is initiated by the proxy 6. Access by the VM 2 to the memory 4 can be discerned by the proxy 6 by way of the virtualization layer (also called Virtual Machine Manager or Hypervisor) because this is responsible for the execution of every instruction in the VM 2 and this simplifies monitoring. A different solution is required for access by the PLC 1, however. The use of the operating system means (for example an exception) or the provision of a suitable interface in the PLC 1 are the only remaining options in this case. Access by the proxy 6 is completely executed, provided no access by the PLC 1 can be registered or processing of VM access has been concluded to the extent that termination of VM access and execution of PLC access is possible within the total time Δ available (see, e.g., FIG. 4). If this is not the case, a "roll back" of VM access is induced and then PLC access executed (see, e.g., FIG. 3). In each case, adherence to the total time Δ is thus ensured.

The illustrated time response produces the advantage that the time variance or period between the minimum and maximum access times by the PLC 1 is 1/x $\Delta_{VM}$ at most, where x results from the "roll back" method. When using a simple recovery algorithm for writing back into the "roll back", x=1, whereas shorter "roll back" times can be achieved with specific transaction methods (for example, via cache). The reaction time of PLC 1 is accordingly extended proportionally to the access time of the virtual machine. In turn, this means that the increase in the reaction time depends on the type of memory used and the configuration of the memory access operations by the virtual machine.

Different cases of memory access by the PLC and the VM to a shared memory will be illustrated in more detail below with the aid of FIGS. 2 to 4. The illustrated cases differ in the access instants of the PLC and VM. In the example, only one VM is used and a simple recovery algorithm is used for the "roll back" method, so X=1. The cases which are trivial per se, where there is only one access operation by the PLC or only one access operation by the VM, are not shown in the figures. Each of the figures shows on the left side, respectively, the situation of the times at which access operations by the PLC and VM would occur. The right side of each figure shows in which manner access by PLC and VM is coordinated by the proxy in accordance with the invention.

In the case of FIG. 2, an access request by the PLC 1 occurs at time t0. The corresponding access 20 ends after a certain time, and then an access request is likewise made by the VM, where the corresponding access 21 would also last a certain time. As shown in the right-hand picture of FIG. 2, access to the shared memory 4 can occur here in exactly the same way as the requests the cycle time of the PLC 1 can be observed. This means that at time t0, actual access 20' by the PLC occurs and immediately thereafter access 21' by the VM. The sum of the two access operations 20' and 21' is less than the total time in which a PLC access must reliably occur.

FIG. 3 shows the case where the PLC again makes an access request 30 at time t0. The VM has already made an access request 31 with a certain duration earlier. If access by the PLC were to only occur after conclusion of access by the VM, the admissible total time Δ would be exceeded. The proxy 6 therefore coordinates the two access operations as follows: the VM is subordinate with respect to memory access. According to the right-hand picture in FIG. 3, its memory access was started because there was still no request by the PLC at the start of access. If the proxy now experiences the access request 30 by the PLC at time to, it recognizes that access 31' by the VM must be interrupted, so access 30' by the PLC can occur in the cycle time (total time Δ). For this reason, the proxy 6 initiates a "roll back" of the access process 31' by the VM performed up to time t0. The changes in the memory 4 effected by access 31' are reversed by the "roll back" 32'. The "roll back" involves a simple recovery algorithm and x=1. Consequently, the "roll back" 32' lasts as long as the previous memory access 31' by the VM. The actual memory access 30' by the PLC 1 can occur immediately after the "roll back" 32'. The total time Δ is not exceeded by this memory access 30'. Access 31'' by the VM can then actually occur following access 31' by the PLC 1. This access 31'' occurs in the required length of time. It is not critical in this connection if the total time Δ is exceeded, because the VM 2 or the CaM 5 implemented thereon is a subordinate system. The case of FIG. 3 corresponds to the first variant in above equation (1).

In the case of FIG. 4 firstly an access request 41 is made by the VM. At time t0 the access request 40 by the PLC occurs again. In this case the proxy establishes that access 41' by the VM can actually be completely executed and access 40' by the PLC can take place immediately thereafter without the total time Δ being exceeded. A "roll back" is not required here. The cycle time of the PLC is also observed therefore.

As the example illustrated above shows, dynamic access time regulation is therefore possible by way of the proxy 6 to meet the specific demands of the interaction of a PLC with one or more virtual machine(s).

Figure 5:
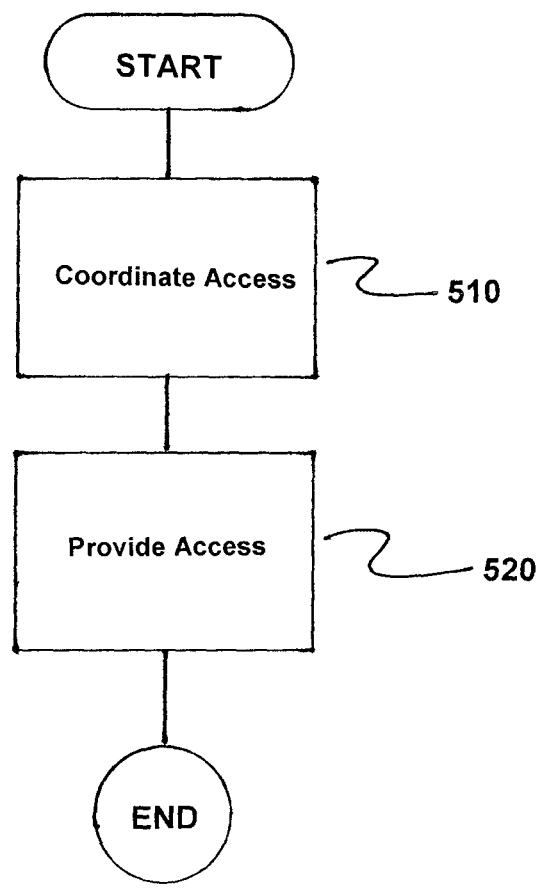
FIG. 5 is a flowchart of the method in accordance with the invention.

FIG. 5 is a flow chart of a method for operating a computation apparatus. The method comprises coordinating access by a subordinate system (2) to a memory (4) of a programmable logic controller (1) such that simultaneous access by a component of the programmable logic controller (1) has priority over access by the subordinate system (2), as indicated in step 510. The programmable logic controller (PLC) is then provided with reliable access to the memory (4) within a predefined period Δ, as indicated in step 520.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computation apparatus comprising:
    a programmable logic controller implemented in the computation apparatus;
    a memory integrated in the programmable logic controller, a component of the programmable logic controller having access to the memory;
    a system subordinate to the programmable logic controller with respect to an operation to access the memory, the subordinate system including a virtual machine which ensures operation of the subordinate system separately from the programmable logic controller such that a change in the programmable logic controller has no effects on the subordinate system; and
    a proxy device implemented in the computation apparatus and configured to coordinate access to the memory of the programmable logic controller by the subordinate system such that simultaneous access by the component of the programmable logic controller has priority over access by the subordinate system;
    wherein the proxy device ensures that the programmable logic controller reliably receives access to the memory within a predefined period Δ; and
    wherein the proxy device ensures that access by the subordinate system to the memory is completely terminated if an access request from the programmable logic controller exists, and complete access by the programmable logic controller is still ensured within the predefined period Δ from the access request.

2. The computation apparatus as claimed in claim 1, wherein at least one of a control and monitoring unit, a simulation unit and a tool management unit is implemented by the virtual machine.

3. The computation apparatus as claimed in claim 1, wherein the proxy device forms part of the programmable logic controller.

4. The computation apparatus as claimed in claim 1, wherein, in an event of the access request from the programmable logic controller, the proxy device ensures that access by the subordinate system is revoked if its completion would mean it would not be possible for the programmable logic controller to gain access within the predefined period Δ.

5. A method for operating a computation apparatus, comprising:
    coordinating access by a subordinate system to a memory of a programmable logic controller such that simultaneous access by a component of the programmable logic controller has priority over access by the subordinate system, the subordinate system including a virtual machine which ensures operation of the subordinate system separately from the programmable logic controller such that a change in the programmable logic controller has no effects on the subordinate system; and
    providing the programmable logic controller with reliable access to the memory within a predefined period Δ;
    wherein access by the subordinate system to the memory is completely terminated if an access request by the programmable logic controller exists and complete access by the programmable logic controller is still ensured within the predefined period Δ from the access request.

6. The method as claimed in claim 5, wherein, in an event of the access request by the programmable logic controller, access by the subordinate system is revoked if its completion would mean it would not be possible for the programmable logic controller to gain access within the predefined period Δ.

7. The method as claimed in claim 5, wherein, in an event of the access request by the programmable logic controller, access by the subordinate system is revoked if its completion would mean it would not be possible for the programmable logic controller to gain access within the predefined period Δ.

* * * * *